United States Patent [19]

Dry et al.

[11] 4,251,346

[45] Feb. 17, 1981

[54] PROCESS FOR COAL LIQUEFACTION

[75] Inventors: Leonard J. Dry, Robindale; Cornelius Kleynjan, Lochvaal; Quintin J. Beukes, Sasolburg, all of South Africa

[73] Assignee: Sasol One (Proprietary) Limited, Orange Free State, South Africa

[21] Appl. No.: 969,473

[22] Filed: Dec. 14, 1978

[30] Foreign Application Priority Data

Dec. 21, 1977 [ZA] South Africa ........................ 77/7585

[51] Int. Cl.³ .......................... C10G 1/06; C10G 1/00; C10G 9/14; C01B 31/00

[52] U.S. Cl. ...................................... 208/10; 208/131; 208/8 LE; 423/445; 423/448; 252/502

[58] Field of Search ....................... 208/8 LE, 10, 131; 423/445, 448; 252/502

[56] References Cited

U.S. PATENT DOCUMENTS

| | | | |
|---|---|---|---|
| 3,518,182 | 6/1970 | Paterson | 208/131 X |
| 3,558,468 | 1/1971 | Wise | 208/8 LE |
| 3,563,884 | 2/1971 | Bloomer et al. | 208/131 X |
| 3,799,865 | 3/1974 | Suetsiger et al. | 208/131 |
| 3,966,584 | 6/1976 | Gray et al. | 208/8 LE |
| 4,019,975 | 8/1977 | Urquhart | 208/10 |
| 4,045,329 | 8/1977 | Johanson et al. | 208/10 |

FOREIGN PATENT DOCUMENTS

| | | | |
|---|---|---|---|
| 2735257 | 9/1978 | Fed. Rep. of Germany | 208/8 LE |

*Primary Examiner*—Delbert E. Gantz
*Assistant Examiner*—William G. Wright

[57] ABSTRACT

The invention provides a process for the liquefaction of coal. The comminuted coal is slurried in a solvent or pasting oil and digested, normally under hydrogen pressure, e.g. of 50 to 250 atmospheres partial pressure, under catalytic conditions, at temperatures between about 380° and 500° C., preferably 400° to 470° C. and residence times between about 10 and 100 minutes. The solvent or pasting oil is obtained wholly or mostly by recycling from the distilled fractionation of the reaction products. The solvent system comprises a light fraction in the boiling range up to 200° C. and a heavy residue fraction, boiling mainly above 450° C., there being a more or less well-defined lack of solvent in a boiling range intermediate between 200° and 450° C. Preferably less than 20%, e.g. 5% or less of the solvent system boils between 200° and 450° C. The ratio of low boiling to high boiling solvent is preferably from about 3:1 to 1:3.

The process can be controlled so that the coal is converted virtually completely into distillable products, more particularly predominantly in the crude diesel fuel range (200° to 450° C.). Optionally fractionating residue may be recovered as a further valuable product for making exceptionally high grade electrodes by delayed coking at 500° C. followed by graphitization at 1400° C.

31 Claims, 3 Drawing Figures

PROCESS FOR COAL LIQUEFACTION

BACKGROUND OF THE INVENTION

The present invention relates to a process for converting coal directly into predominantly gaseous to liquid products suitable for making hydrocarbon fuel by digesting the coal in a particulate, more particularly comminuted condition at elevated pressure and temperature, preferably under hydrogenation conditions, more particularly in the presence of hydrogen under pressure, slurried in a solvent or pasting oil for coal, and wherein the solvent or pasting oil includes recycled heavy bottoms fraction and a recycled lower boiling fraction.

Several such processes are known. In order to attain satisfactory depths of extraction it is usually preferred to employ hydrogenative conditions. Such hydrogenative conditions may partly or wholly be created by the use of a solvent having pronounced hydrogen donor properties, but are usually due at least in part to the employment of hydrogen under pressure, with or without an extraneously introduced hydrogenation catalyst.

Since Bergius hydrogenated coil to oil in 1911, a process requiring very high pressures, several coal liquefaction processes have been developed to at least a continuous bench unit stage and many more such processes have been proposed. The latter have mostly been based on results obtained in batch autoclave experiments.

Although the production units constructed and run in Europe, notably in Germany, before and during World War II were technically successful, the very high pressures and temperatures that these units used made them uneconomic in any peace-time economy where there is a competitive market (W. R. K. Wu and H. H. Storch, Bureau of Mines Bulletin 633, 1968, p 6).

Today there is considerable incentive to develop a coal conversion process that would successfully compete with petroleum as a source of conventional distillate fuels. A prime prerequisite for lowering the cost of coal hydrogenation, or more accurately, hydrocracking, is a relatively low pressure process in which hydrocracking would proceed rapidly enough to yield distillable liquid hydrocarbons as the main product. The process developed by Hydrocarbons Research Inc., termed the H-Coal process, is an important advance in this direction both technologically and economically (see "Present Status of the H-Coal Process" by C. A. J. Johnson et al, Clean Fuels from Coal Symposium II, Institute of Gas Technology, Chicago, June 1975). The H-Coal process uses a supported Co-Mo catalyst in an ebullating bed reactor at pressures around 200 bar and temperatures above 400° C. It can produce as main product either socalled "syncrude", i.e. a product resembling crude oil, yielding various distillates and some, e.g. about 10% undistillables, or a partially distillable heavy furnace oil. The catalyst is fouled relatively rapidly and fresh catalyst has to be added to and used catalyst withdrawn from the reactor at intervals. Coal is introduced to the reactor in the form of a slurry with a heavy oil fraction.

In contrast to the H-Coal process, processes being developed by the Gulf Research and Development Company to produce distillates from coal slurries make use of fixed catalyst beds.

In one instance (S. W. Chun, D. C. Cronauer and T. W. Leslie, U.S. Pat. No. 3,957,619) a special reactor with free segments interspersed with catalyst-packed segments is advocated for coal hydrocracking. In another, a coal solvent slurry is passed through a packed catalyst bed in which the void volume is large (A. A. Montagna and H. G. McIlvried U.S. Pat. No. 3,997,426). The Gulf R and D Company has also developed a coal liquefaction process in which the ash in the coal is used as hydroliquefaction catalyst. Here a solvent-coal slurry, the solvent being a fraction having roughly a boiling range of 200°-450° C. at atmospheric pressure, is fed to the reactor. The process is completely self-sustaining in terms of solvent and the product varies from a solid low-ash low-sulphur SRC (solvent refined coal) to a heavy partially distillable heavy fuel oil (G. R. Pastor and C. H. Wright, U.S. Pat. Nos. 3,892,654; C. R. Hinderliter and R. E. Perrussel, 3,884,796; W. C. Bull, C. H. Wright and G. R. Pastor, 3,884,794; C. H. Wright and G. R. Pastor, 3,884,795).

In accordance with U.S. Pat. No. 3,726,785 the slurrying of coal in two-coal-derived solvent fractions, a light and a heavy fraction is described. According to that patent the two solvents are to be used separately, and the combination of the two solvents in a single solvent system is advised against.

Johanson and Wolk have in a recent patent (U.S. Pat. No. 4,045,329) shown that when heavy residual oils, e.g. those boiling above 427° C. at 1 atm., are recycled to the H-Coal reactor, it is advantageous to introduce into the reactor simultaneously a certain amount of distillate boiling in the range 232°-316° C. at 1 atm. The preferred quantity of the recycled 232°-316° C. fraction is 5-25% of the total recycled oil and its function is to control the viscosity of the liquid in the ebullating reactor, thus providing adequate hydrocracking conditions for breaking the +427° C. fraction down to distillate in the 204°-427° C. boiling range.

The product spectrum of this process extends fairly uniformly across the whole range from methane gas to the top of the diesel oil range. The yield of gaseous products is substantial. The total diesel oil yield represents less than half of the total product yield and is usually less than half of the total yield of distillate products. Part of the total yield (typically about 9%) is unavoidably in the form of undistillable residue.

The "ebullated" bed concept and the use of a catalyst are essential features of the process disclosed in U.S. Pat. No. 4,045,329.

The use of light solvents above their critical temperatures is known in coal liquefaction. Of especial relevance are patents by D. B. Urquhart (SA 75/6634 and U.S. Pat. No. 4,019,975) in which it is shown how coal can be partially liquefied to a main product which is either distillate or a tar-like residue, depending on whether or not a catalyst is used. In both cases, however, roughly 50% of the coal was reported as unreacted.

Moreover, in the claimed process of the Urquhart invention the only solvent used for slurrying is a light fraction such as toluene. The same inventor has also reported that liquefied coal can be separated from unreacted coal in a supercritical separation step, wherein the liquefied coal effectively distils with the supercritical solvent under carefully adjusted conditions, leaving behind the unreacted coal, including the inorganic ash. Such a light solvent can have an advantageous effect on the mass transfer of hydrogen to the coal molecules undergoing cracking and hydrogenation. However, the light solvent suffers from the severe disadvantage that it has limited coal carrying capacity through, in particular, the preheaters of a continuously operating liquefaction unit. Coal tends to settle in the preheater tubes despite high linear velocities of gas (hydrogen or hydrogen-containing) and solvent coal slurries, even when the coal is ground to below 200 mesh. Coal deposition in the preheaters is highly undesirable since it forms blockages which can rapidly harden. To summarise then, difficulties have been experienced in prior art processes to achieve adequate self-sufficiency in respect of solvent requirements and/or adequate solids carrying capacities of the solvent. Solvents which do have a desirable solid carrying capacity tend to result in net products mainly consisting of solid or near solid products, there being little or no net product in the highly desirable liquid hydrocarbon region. Increasing the hydrogenation rate, either in order to improve the depth of extraction or to increase the yield of liquids has sometimes tended to result in excessive gas yields. There exists a need in the art for a convenient process which is capable of producing high extract yields, particularly in the liquid hydrocarbon range, more particularly the diesel fuel range with low to modest hydrogen consumption, very high pressures being avoided. At the same time the main products should be distillates which can be refined to conventional liquid fuels and chemicals without undue difficulty.

Preferred embodiments of the present invention are directed to processes, capable of converting substantially all the liquefiable coal components to distillate products, whilst being capable optionally to be so modified that a non-distillable residue is formed as a valuable byproduct having surprisingly superior characteristics as a raw material for making premium electrode coke.

Preferred embodiments of the present invention are furthermore directed to processes yielding more than 50% products in the diesel oil range based on total distillable products and preferably even when based on the total range of all products, more particularly as much as 60% or more based on dry ash-free coal.

SUMMARY OF THE INVENTION

In accordance with the present invention, there is provided a process as set out in the opening paragraph which comprises employing as the solvent or pasting oil in which the coal is slurried, a solvent system comprising at least 20% by mass of a comparatively low boiling fraction, liquid at room temperature and boiling not higher than 200° C., more than 10% by mass of a high boiling fraction, mostly solidifiable at room temperature, but liquid at the digesting temperature, and not more than 30% by mass boiling between 200 and 450° C., maintaining said temperature for digesting above the critical temperatures of the components of the low boiling fraction and distillatively fractionating the resulting mixture of solvent system and digestion products, recovering from said fractionating liquid hydrocarbons, those boiling from 200 to 450° C. constituting not less than 50% of the total liquid hydrocarbons recovered and recycling from said fractionating to the slurrying stage material comprising a fraction boiling below 200° C. and a bottoms fraction.

Preferably, the liquefaction and fractionating are so regulated and interrelated that more than 50% by mass of all products withdrawn and recovered from the fractionating is in the boiling point range from 200° to 450° C. (at normal pressure).

The terms "solvent" and "pasting oil" are used herein as synonyms and—unless the context indicates otherwise, refers to the composition thereof at the coal pasting or slurrying stage, i.e. before the slurry enters the reactor.

Preferably the solvent is substantially coal-derived. Indeed, in accordance with the preferred process, at least 80% and preferably substantially all the solvent is derived from recycling from the product fractionation stage. Accordingly, even if a non-coal derived solvent were to be used initially, the repeated recycling would eventually result in the solvent system being substantially coal-derived.

In order to attain comparatively high net yields of products which are liquid at normal temperature and pressure, it is advantageous to provide in the solvent system for a distinct substantial boiling range gap between the low boiling and the high boiling fraction of the solvent system. Preferably the solvent or pasting oil in which the coal is slurried contains from 0 to 20% by mass material boiling between 200 and 450° C., more preferably from 0 to 10%, e.g. less than 5% by mass material boiling between 200° and 450° C. In these conditions it is observed that the digestion process tends to repolenish this gap by the formation of product boiling largely in the diesel range region at the expense of higher boiling material. This effect can in some cases result in a shortfall of high boiling solvent material for recycling purposes. However, this shortfall can then be replenished with ordinary SRC (solvent refined coal) produced separately. In this manner the present process can be combined conveniently with a conventional SRC process, e.g. as developed by the Gulf Oil Co. The latter process can the produce SRC inter alia for use in the present process whereas the present process will produce 200° to 450° C. distillate, a portion of which can be used to supplement any shortfall in the conventional SRC process. By this kind of combination it is possible to attain a particularly versatile overall product range from light naphthna through to middle distillates, and bottoms fractions which can be identical to or similar to SRC or have special valuable characteristics. This latter aspect will be referred to again further below.

The process in accordance with the invention can be carried out batchwise, although it is preferred for the process to be carried out continuously, a procedure enhanced by the solids carrying capacity of the solvent system.

Preferably the coal is slurried with the pasting oil in a ratio of pasting oil to coal of from 5:1 to 1:1,5, more preferably from 5:1 to 2:1 and most preferably from 3:1 to 2:1 (by mass, based on dry, ashfree coal).

"Coal" in the sense of the present specification includes all kinds of liquefiable coal, including peat. This definition normally excludes anthracite which generally is not suitable for liquefaction by solvent extraction method. Different coals have different degrees of sensitivity for purposes of the present invention in respect of the ratio of light to heavy solvent fractions, low ranking coal such as brown coals are generally more sensitive to this ratio than are the higher ranking coals such as bituminous coals, at least in respect of liquid product yields.

In all cases, however, the high boiling fraction (within the limits of acceptable viscosity ranges) enhances the solids carrying capacity of the low boiling solvent. Its use also favourably influences to a greater or lesser extent the yield of liquid products boiling below the said high boiling fraction.

Thus, whilst the light fraction plays an important role in the extraction of the coal, it is also found that the high boiling fraction has an important influence on the recovery of desirable liquid products. Accordingly, in the preferred embodiments, the coal is slurried in a ratio of coal to high boiling fraction of from 1:0,5 to 1:3. The preferred ratio is from 1:0,8 to 1:2,5, and the more preferred ratio is from 1:1 to 1:2. The high boiling fraction is substantially composed of bottoms fraction of which upwards of 80%, preferably upwards of 90% by mass boils above 400° C. at normal pressure.

Generally speaking, the solvent system comprises between 20 and 80% of low boiling solvent, boiling between 35° and 200° C. at normal pressure. A preferred mass ratio in the pasting oil of said high-boiling fraction to low-boiling fraction is from 3:1 to 1:3, more preferably from 2:1 to 1:2.

In accordance with preferred embodiments the solvent system comprises more than 30% of said high boiling fraction. When the coal is brown coal, it is usually found that the solvent system should comprise more than 35% by weight of the said high boiling fractions. The optimum ratios of solvent fractions can readily be determined by routine experiment in the light of the present teachings.

Although in special cases it is possible to carry out the invention in the absence of introduced molecular hydogen, it is normally contemplated that the process is carried out with the introduction of hydrogen to produce hydrogenative conditions, preferably said hydrogen being present at a partial pressure above atmospheric pressure.

Broadly the digesting step may take place at from 380° to 500° C. More particularly, the preferred process as outlined above is carried out such that said digesting proceeds substantially between 400° and 480° C. at a hydrogen partial pressure in the range of 50 to 250 bar and in the presence of a hydrogenating catalyst.

More specifically said digesting may proceed at from 400° to 470° C., from 50 to 200 bar hydrogen partial pressure, from 80 to 300 bar total reactor pressure, from 10 to 100 minutes residence time and a catalyst content equivalent in catalytic effect to from 0,1 to 10% by dry mass ammonium molybdate impregnation of the coal.

In specific catalysed embodiments, wherein the coal is slurried with pasting oil in a mass ratio of from 1:2 to 1:5, the pasting oil comprises from 40 to 60% by mass of low boiling fraction boiling in the range 35° to 200° C. and from 60 to 40% by mass of high-boiling fraction, substantially composed of bottoms fraction of which upwards of 80% boils above 400° C. at normal pressure.

The process may for example be carried out in the presence of a catalyst of one or more of the metals molybdenum, tungsten, iron and cobalt, all in the sulphide state. The conditions of the process are normally such that the catalyst reverts to the sulphide state if it is not in such state initially. This conversion of the catalyst into its sulphide state may be accelerated in a manner known per se by the introduction of elemental sulphur or sulphur containing compounds.

The presence or absence of a catalyst and the amounts thereof will depend inter alia on the reactivity of the coal which may or may not contain significant amounts of catalytically active substances in its mineral matter. The catalyst, if used, may be but need not necessarily be applied by impregnation of the coal. This will depend to a large extent on the type of reactor employed. The invention is not limited to specific types of reactor. Any suitable reactors known to persons skilled in the art may be employed.

Thus, instead of using catalyst impregnated coal, e.g. in an upflow of downflow type of reactor, there exist alternatives, such as:

(a) passing the preheated slurry of coal and pasting oil through an ebullated bed of catalyst particles, e.g. of Co, Mo or similar hydrocracking/hydrofining type as in the aforesaid H -coal process;
(b) adding a particulate catalyst to the slurry of coal and pasting oil;
(c) adding a liquid catalyst to the pasting oil;
(d) passing the preheated slurry of coal and pasting oil through a packed catalyst bed (e.g. of the Gulf type) or through a fixed bed (e.g. of the Synthoil type).

Chemically speaking, the light solvent fraction is preferably entirely or substantially of a hydrocarbon nature. However, the presence of organic compounds containing oxygen, nitrogen or sulphur is not found to be a drawback in practice. Toluene is a convenient light solvent with which a continuous process in accordance with the invention can be started. However, the light solvent eventually becomes a coal-derived mixture of hydrocarbons and derivates, including oxygen, nitrogen and sulphur hydrocyclic compounds. An important control parameter for the light solvent is its boiling range, this boiling range being preferably chosen such that the light solvent has a pseudo-critical temperature not far below the digesting temperature employed in the process.

The heavy solvent fraction in practice preferably has an initial boiling point of about 380° C. At room temperature this fraction is usually solid, having a ring-and-ball softening point usually above 80° C., and in typical examples of about 100° to 120° C. For reasons not yet fully understood it appears that this heavy fraction has hydrogen donor properties (or acquires such properties during the digestion stage) superior to the hydrogen donor properties of a coal-derived solvent in the 200° to 450° C. boiling range (the most commonly employed conventional solvent). The undissolved solids in the digested coal slurry can be separated off in any conventional manner, e.g. by settling or by filtration. However, it is preferred that the digested coal slurry be subjected to a step of separating off undissolved solids under supercritical conditions in which the solubilised coal components are distilled off, carried over with supercritical solvent vapour, whilst the insolubles are left behind as a residue.

However, other known methods may be employed for separating solids from the liquefied products, e.g. filtration, sedimentation, centrifugation or use of hydroclones. Such step can follow immediately after the reactor or it can be carried out on the distillation residue diluted with the light distillate.

It is a particular advantage of the present invention that the solid separation step carried out on those materials which are to be recycled to the coal slurrying stage need not be very thorough and can be relatively simple and cheap. The purpose of that step will be mainly to prevent an undue build-up of insoluble solids.

The present invention includes embodiments wherein bottoms fraction is recovered as a product. Unexpectedly it is found that this bottoms fraction has particularly favourable properties for conversion into graphite electrodes of exceptionally low coefficients of thermal expansion as are required for special metallurgical purposes. In this respect the bottoms fraction recovered from the process is substantially superior to some conventional SRC materials which may be employed to replenish the shortfall of high-boiling solvent in the recycling stage, resulting from the recovery of this bottoms fraction as a valuable product.

For manufacturing such graphite the bottoms fraction is recovered and subjected to delayed coking in a manner known per se to produce needle coke. This so-called green coke is produced at 500° C. in a manner known per se. When this green coke produced in accordance with the invention is calcined at 1400° C., the resulting product has been observed to exhibit an exceptionally low coefficient of thermal expansion, particularly suitable for conversion to graphite "ultra-high power" electrodes, e.g. as used in steelmaking. Preferred calcined coke thus produced has a coefficient of thermal expansion not exceeding and preferably less than $0{,}5\times10^{-6}$ °C.$^{-1}$, a prerequisite for making ultra-high power graphite electrodes. Preferred embodiments have a thermal coefficient (at 200°) not exceeding $0{,}4\times10^{-6}$, which is superior to certain premium petroleum coke.

In the following the invention will be further explained by way of certain examples, partly with reference to the accompanying drawings. The examples should be read in conjunction with the general aforegoing description.

DESCRIPTION OF THE PREFERRED EMBODIMENTS

Figure 1:
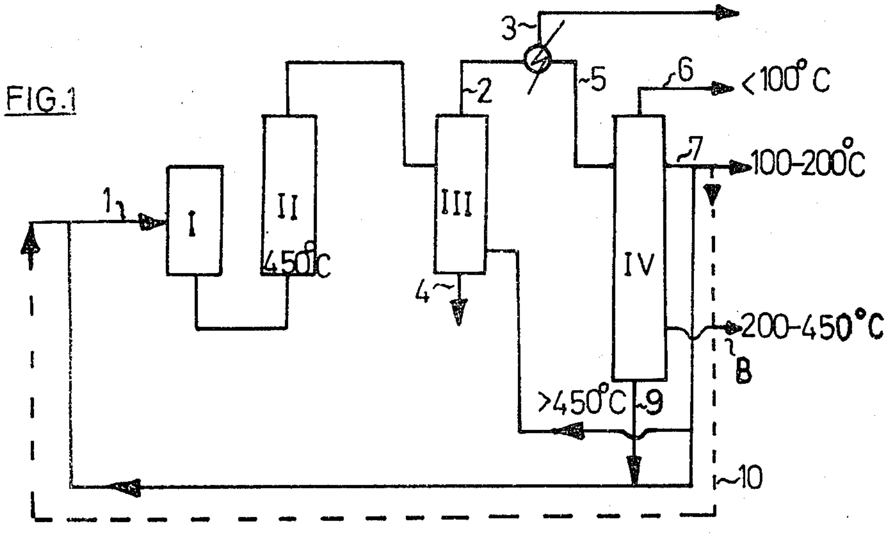
FIG. 1 represents a block diagram of a plant for carrying out an embodiment of the invention.

Referring to FIG. 1, the comminuted coal together with recycle solvent is introduced at 1 into a coal slurry vessel I. The slurry passes continuously into the reactor II maintained at 450° C. The digested slurry passes from the reactor II into a supercritical separator III which leaves behind unreacted material 4 including ash as a residue. The material flashed off at 2 under supercritical conditions is partly condensed to separate gas at 3, whilst the condensate 5 is fed into a fractionating column IV which produces an overhead fraction 6 boiling at less than 100° C., a gasoline fraction 7 boiling at between 100° and 200° C. and a crude diesel oil fraction 8 boiling between 200° and 450° C. The residue 9 of the column boiling above 450° C., together with part of the gasoline fraction boiling between 100° and 200° C. is recycled (broken line 10) to 1 and slurried with the coal in the coal slurry vessel I.

Figure 2:
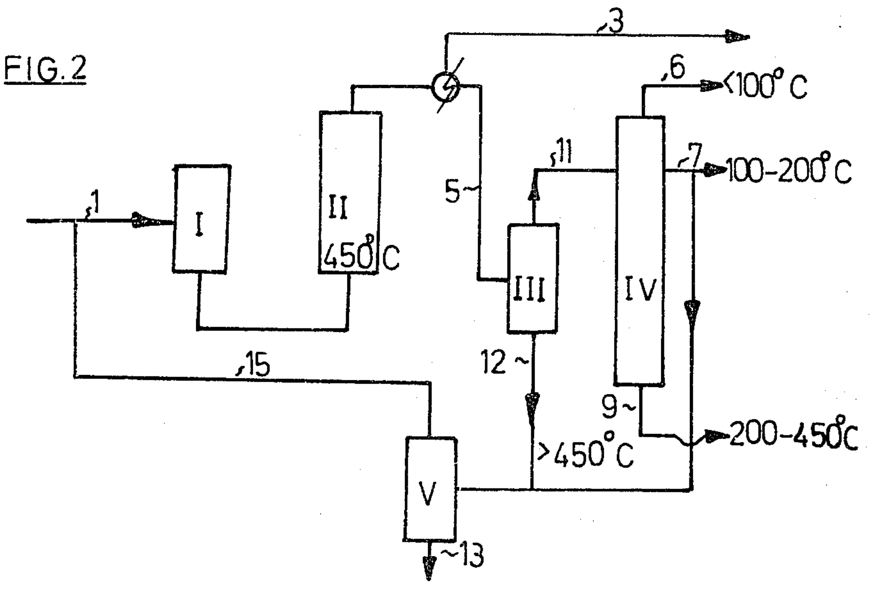
FIG. 2 represents a block diagram of an alternative plant for carrying out a different embodiment of the process in accordance with the invention.

Referring to FIG. 2, coal together with recycle solvent is at 1 fed into the coal slurry vessel I. The slurry is reacted in reactor II at 450° C. as in the previous example, the digested slurry passing into a condenser, leaving an uncondensed gas product 3 and condensate 5 which is fed into the flash distillator III to separate a residue boiling about 450° C. and an overhead fraction which is passed into the fractionating column IV. There a further separation takes place into an overhead fraction boiling below 100° C., a distillate 7 in the gasoline range (100° to 200° C.) and a bottoms fraction 9 in the diesel range 200° to 450° C. Part of the gasoline fraction 7 together with the residue 12 of the flash distillator III is passed into a solids separator V, e.g. a rotary pressure filter. There the unreacted material 13 including ash is separated off, whilst the liquid filtrate 15 is recycled to the coal slurry vessel I.

If (as shown in FIGS. 1 and 2) total recycling of the bottoms fraction (9;12) takes place, the separation of unreacted material and ash (III;V) need not be very complete and can be relatively cheap.

EXAMPLE 1

Washed Waterberg coal, milled to a powder finer than 200 mesh, was impregnated with a solution of ammonium molybdate. After drying the coal contained 2,9 mass % of $MoO_3$. The impregnated coal (400 g), sulphur (2,6 g), and solvent (1 200 g) were in each test placed in a 5 l autoclave. Where the solvent consisted of two fractions, 600 g of each was used. The closed autoclave, after nitrogen flushing, was pressurised with hydrogen to about 80 bar, then heated to 450° C. and kept there for 75 minutes with constant stirring. At 450° C. the total pressure was about 200 bar.

The autocalve was then allowed to cool to 350° C. and connected directly to a condensation, metering train in which the final condenser was kept at −60° C. The effluent gas was metered and stored in a single large container after scrubbing out hydrogen sulphide. The gas was then analysed by mass spectrometer.

When no further material distilled from the hot autoclave, pyridine (800 ml) was introduced into the autoclave under nitrogen pressure in order to assist in the quantitative rinsing out of the autoclave contents (the use of pyridine is not part of the process as contemplated in practical operating conditions).

The autoclave contents were thoroughly stirred, cooled to room temperature and filtered under pressure. The pyridine filtrate was worked up by distillation and also the total condensate from the hot autoclave. In each case 1 200 g of total solvent was recovered except in test D where some solvent cracked to lighter material. Where two fractions were used, 600 g of each was recovered. It was found that where toluene is used initially as the light solvent fraction, recovery of a 100°-180° C. fraction adequately supplied recycle light solvent.

Typical results obtained are set out in Table 1 (all boiling points are given in the equivalent °C. at 1 bar).

TABLE 1

| Test | A | B | C | D |
|---|---|---|---|---|
| Solvent | | | | |
| light fraction | Toluene | Toluene | Toluene | Toluene |
| heavy fraction | 200-400° C.$^{(1)}$ | >400° C. | — | 200-400° C.$^{(1)}$ |
| Reaction pressure | | | | |
| bar | 200 | 200 | 200 | 200 |
| Products of converted coal on a DAF(*) basis, mass % | | | | |

TABLE 1-continued

| Test | A | B | C | D |
|---|---|---|---|---|
| $C_1$–$C_3$ | 11,0 | 14,4 | 7,9 | 16,7 |
| $C_4$–200° C. | 22,2 (C₄–400° C.) | 16,1 | 2,2 | 14,0 (C₄–400° C.) |
| 200–400° C. | | 44,1[2] | 31,0 | |
| >400° C. | 32,8 | 0 | 34,5 | 37,4[4] |
| $CO_x$,$H_2S$,$H_2O$,$NH_3$ | 17,4 | 18,7 | 14,4 | 24,0 |
| Total "products"[3] | 83,4 | 93,3 | 90,0 | 92,2 |

(*)dry ash-free
[1]The solvent 200–400° C. was in both cases so-called equilibrium solvent from a conventional continuous SRC pilot plant.
[2]Distillation was stopped at 370° C., thereby yielding the required quantity of heavy recycle solvent in this case.
[3]Undissolved coal, excluding mineral ash and added catalyst, is found by subtracting this total from 100.
[4]Under more favourable conditions for solvent recovery, considerably more product >400° C. is made.

The striking and important result illustrated in the above table is that in Test B, which demonstrates the present procedure, no net production of product boiling above 370° C., in this case, is realized. In all the other tests, substantial quantities of coal were converted to material boiling above 400° C. In Test B liquefaction was substantially complete, virtually only fusain remaining undissolved. The diesel range fraction represented 59,5% of all hydrocarbon products and 73,3% of all liquid products.

EXAMPLE 2

In this example the same coal powder as used in Example 1 was impregnated to contain 0,5% (mass) of $MoO_3$ by means of ammonium molybdate solution. Of this impregnated coal, after drying, 80 g were placed in an 1 l autoclave with 120 g toluene, 120 g heavy solvent fraction which had an initial boiling point of 400° C. and a ring-and-ball softening point of 66° C., and 0,8 g sulphur. Liquefaction was carried out at 440° C., 210 bar for 30 minutes.

At the end of the reaction time, 2 000 ml toluene was pumped through the autoclave at a rate of ca. 27 ml/minute. In this way all liquefied coal was carried out of the autoclave. Product work-up gave the results in Table II.

TABLE II

| Product | Yield (as mass % of dry ash-free coal) |
|---|---|
| $C_1$–$C_3$ | 12,7 |
| $C_4$–200° C. | 11,9 |
| 200–459° C. | 57,0 |
| >459° C. | 0,0 |
| $H_2O$, $CO_x$, $NH_3$, $H_2S$ | 11,0 |
| Unreacted (fusain) | 7,4 |

The recovered heavy solvent fraction (>459° C.) contained 0,2% ash and had a ring-and-ball softening point of 112° C.

The experiment outlined above was the tenth in a sequence of tests designed to show that a steady state w.r.t. the two solvents fractions and the heavy distillate product could be attained.

The final boiling point of the net product, which is also the initial boiling point of the heavy recycle solvent fraction, depends on the reaction conditions used, e.g. where 2,9% $MoO_3$ was used instead of 0,5%, a steady state was reached where the net product final boiling point was 400° C. instead of 459° C. as in the above example. The significance of this latter finding is as follows: the final boiling point of the net product is determined by a combination of parameters, namely pressure, temperature, addition of catalyst recycled ratio, and residence time. The addition of more catalyst is the easiest change if it is desired to bring down this final boiling point temperature. The addition of more catalyst is no disadvantage when employing a catalyst which can easily be recovered. This applies to molybdenum which is readily recovered in a conventional manner, e.g. by oxidation followed by sublimation of the volatile molybdenum oxide or by leaching with ammonia.

The experiment demonstrates total conversion of substantially all liquefiable coal into distillable hydrocarbons, of which 69,9% was in the diesel range and only 15,6% hydrcoarbon gas.

EXAMPLE 3

In this example the unexpected importance of the ratio of light solvent fraction to heavy solvent fraction is illustrated when brown coal is liquefied by the present procedure.

In each autoclave test the following conditions were used:

| | |
|---|---|
| Reaction temperature | 420° C. |
| Pressure at reaction temperature | 220 bar ($H_2$ atmosphere) |
| Residence time | 75 minutes |
| Catalyst | 0,5% $MoO_3$ impregnated as before onto the coal |
| Coal to solvent (total) ratio | 1 to 2 |
| Light solvent fraction | toluene |
| Heavy solvent fraction | >420° C. Ring and ball softening point 156° C. |

Results were as follows:

| % light solvent | % heavy solvent | DAF coal basis % extraction |
|---|---|---|
| 100 | — | 74 |
| 90 | 10 | 45 |
| 80 | 20 | 33 |
| 65 | 35 | 29,5 |
| 60 | 40 | 73 |
| 57,5 | 42,5 | 84 |
| 55 | 45 | 88 |
| 50 | 50 | 91 |
| 40 | 60 | 89,5 |

The results show that for the brown coal in question the light solvent fraction, in this case toluene, should not exceed a maximum of about 55% of the total solvent. This figure may vary considerably from coal to coal and according to the chemical nature of both the light and the heavy solvent fractions, a matter easily determined by simple preliminary experiments.

Some coals are not unduly sensitive as regards total extract yield to the light fraction/heavy fraction ratio in the solvent. The following results, using a bituminous coal instead of a brown coal and the same test conditions as those given above, illustrate the point:

| % Light solvent | % Heavy solvent | DAF Coal Basis % Extraction |
|---|---|---|
| 100 | 0 | 94 |
| 90 | 10 | 95 |
| 70 | 30 | 94 |
| 50 | 50 | 96 |

Although in the latter case the solvent composition apparently has little effect on the total yield of extract, the effect is quite pronounced with regard to the nature of the product extracted, there being a progressive increase in the net yield of liquid products, in particular products in the diesel range, as the percentage of heavy solvent is increased and the percentage of light solvent is decreased. Also, the solids carrying capacity of the solvent is improved.

For the 50 and 100% light solvent cases, a total solvent:coal ratio of 3:1 was used, while a 2:1 ratio was used in the remaining two cases.

EXAMPLE 4

In this example it is shown that toluene as such does not have to be used as the light solvent fraction. Methylcyclohexane instead of toluene was found to be as effective; the heavy solvent fraction was in this case coal-derived material having a ring-and-ball softening point of 91° C.

The experimental conditions and the coal used were the same as those set out in Example 1. The products obtained were the following:

| | Yields as mass % of daf coal |
|---|---|
| $C_1$-$C_3$ | 18,9 |
| $C_4$-200° C. | 20,1 |
| 200-394° C. | 44,1 |
| >394° C. | 0 |
| $CO_x$, $H_2S$, $H_2O$, $NH_3$ | 10,4 |
| unreacted (fusain) | 6,5 |

The results show that the essential feature of the light solvent fraction is, within limits, not its chemical nature, but its boiling point or boiling range which must be such that this fraction is in the supercritical state under liquefaction conditions.

EXAMPLE 5

In this example toluene is compared with "equilibrium" 200° to 400°/coal derived liquid as the light components of the solvent, the heavy component of the solvent in each case being conventional SRC material boiling above 400° C. In all eight tests shown the same heavy material was used as the high boiling portion of the solvent. The reaction temperature was 440° C. and the residence time 75 minutes in all cases. The coal was the same as used in Example 1.

The object of this test series was to show that when the solvent was made up of 50% (mass) of toluene and 50% of >400° C. material, more total distillate was produced than when the solvent consisted of 50% (mass) each of 200°-400° C. fraction and >400° C. material. Although this test was not continued until equilibrium had been attained (cf. Example 7), the principles of the invention are adequately illustrated.

In each case 200 g of catalyst-impregnated coal was placed with 300 g>400° C. material and 300 g of either toluene or 200°-400° C. fraction in a 5 l autoclave. When the autoclave reaction product was worked up 300 g of either >200° C. or 200°-400° C. material was collected as recovered solvent while the recovered >400° C. portion of the solvent is recorded as loss or gain depending on how much less or more than 300 g of it was actually found in each case. The results are set out below.

| Solvent is toluene (300 g) and >400° C. material (300 g): | | | | |
|---|---|---|---|---|
| Catalyst quantity, mass % $MoO_3$ | 0,5 | 0,5 | 0,5 | 0,1 |
| Initial reactor pressure, bar | 100 | 70 | 50 | 50 |
| Net products | | | | |
| Water, g | 25 | 23 | 24 | 23 |
| $C_1$-3 gas, g | 30 | 26 | 24 | 26 |
| $C_4$-200° C., g | 24 | 21 | 21 | 14 |
| 200-400° C., g | 138 | 130 | 107 | 96 |
| >400° C., g | −46 | −30 | −6 | −14 |
| % extraction (moisture and ash-free coal) | 97 | 97 | 97 | 84 |
| Solvent is 200-400° C. fraction (300 g) and >400° C.: material (300 g) | | | | |
| Catalyst quantity, mass % $MoO_3$ | 0,5 | 0,5 | 0,5 | 0,1 |
| Initial reactor pressure, bar | 100 | 70 | 50 | 50 |
| Net products | | | | |
| Water, g | 25 | 25 | 23 | 24 |
| $C_1$-3 gas, g | 33 | 30 | 30 | 29 |
| $C_4$-200° C., g | 74 | 74 | 63 | 65 |
| 200-400° C., g | 69 | 59 | 41 | 21 |
| >400° C., g | −31 | −19 | +9 | +21 |
| % extraction (moisture and ash-free coal) | 96 | 96 | 95 | 91 |

From the above results it can be seen that for each set of identical experimental conditions, when toluene was the light solvent fraction used, 13-28% more $C_4$-400° C. product distillate was produced compared to when the 200°-400° C. fraction constituted the lower boiling portion of the total solvent.

A further interesting point is that with toluene as the light portion of the solvent, most of the distillate was a fraction boiling in the 200°-400° C. range, i.e. the diesel oil range. Where both diesel oil and gasoline are desired products, the above product pattern is an advantage. As much gasoline as required can be made from the 200°-400° C. product by conventional hydrofining and hydrocracking, the remainder of the 200°-400° C. product being hydrofined to diesel oil.

In the above example a net shortage of high-boiling solvent fraction is sometimes experienced. This shortage can be made up with SRC produced in a conventional manner, or by changing the extraction conditions.

EXAMPLE 6

The characteristics of bottoms fraction produced as a byproduct of the process in accordance with the present invention (the high boiling solvent shortage being made up if necessary with conventionally produced SRC) are compared with the properties of SRC made by two conventional processes.

Figure 3:
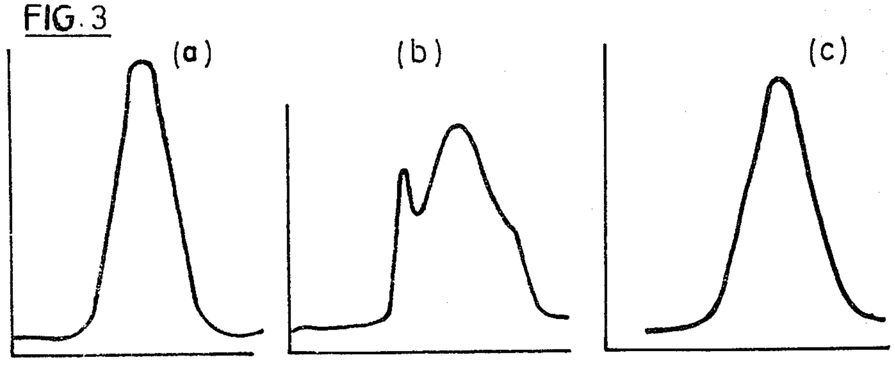
FIG. 3 illustrates for purposes of comparison the molecular weight distribution of bottoms fraction in accordance with the present invention as compared with SRC produced by two conventional processes.

In FIG. 3:

(a) represents the gel permeation chromatogram obtained with the heavy fraction obtained by supercritical solids separation after liquefaction in accordance with condition B (table 1) of example 1;

(b) shows the gel permeation chromatogram of the bottoms fraction made with a conventional 200° to 420° C. solvent in a continuous reactor with pronounced back mixing (a high degree of convection in the reactor as distinct from "plug flow") the digest being filtered;

(c) represents the chromatogram of the bottoms fraction made with a 200° to 420° C. solvent in a batch autoclave and filtered. The same coal was used in all three tests. It is seen that by comparison (a) represents a very narrow molecular weight range.

The abovementioned three samples of bottoms fraction were subjected to delayed coking at 500° C., followed by calcining at 1400° C. The coefficients of thermal expansion of the product were determined by an X-ray method (M. P. Whittaker, F. C. Miller and H. C. Fritz, Ind. Eng. Chem. Prod. Res. Develop., 9 (2), 1970, 187).

In the following table the coefficients of thermal expansion are compared.

| SRC Source | Gel perm. chromatogram | Coeff. therm. exp. /° C. |
|---|---|---|
| Invention supcrit. sepn. | FIG. 3(a) | $0,4 \times 10^{-6}$ |
| Back-mixing reactor | FIG. 3(b) | $2,33 \times 10^{-6}$ |
| Autoclave, filtered | FIG. 3(c) | $1,36 \times 10^{-6}$ |

The relatively low coefficient of thermal expansion of the calcined coke from the bottoms fraction made by the preferred version of the present process FIG. 2 (a) means that this bottoms fraction, unlike the others shown above, will yield premium grade graphite electrodes from the needle coke derived from the bottoms fraction in question.

EXAMPLE 7

Under a given set of reaction conditions, the recycle ratio, which is the ratio of heavy bottoms to feed coal, determines the product spectrum that is obtained. Although for most purposes it would be desirable to convert the coal as fully as possible to distillate products, i.e. a high recycle ratio should be employed, in certain circumstances a lower recycle ratio may be employed in order to produce excess heavy bottoms fraction, which has been found, unexpectedly, to be an excellent raw material for conversion to electrode coke via the delayed coking process. The effect of recycle ratio is demonstrated by the following:

| | 1 | 2 | 3 |
|---|---|---|---|
| Pasting oil:Coal mass ratio | 3:1 | 3:1 | 3:1 |
| Light solvent:heavy bottoms mass ratio | 1:2 | 1:1 | 2:1 |
| Recycle mass ratio (bottoms :coal) | 2:1 | 1,5:1 | 1:1 |
| Product Spectrum, % by mass on DAF coal | | | |
| $C_1$-$C_3$ hydr. gases | 13,8 | 11,9 | 10,2 |
| $C_4$-200° C. | 12.7 | 10,5 | 6,8 |
| 200–450° C. (nominal) | 57,2* | 62,3* | 47,3* |
| Bottoms | 0 | 0 | 18,5 |
| Unreacted (mostly fusein) | 4,8 | 4,3 | 5,3 |
| $H_2O + CO + CO_2$ | 11,5 | 11,2 | 12,0 |

*The actual cutpoints at equilibrium were: Series 1 385° C., Series 2 450° C., Series 3 455° C.

Each series was started with SRC from a conventional SRC operation as bottoms product and toluene as light solvent. The filtered reaction product was fractionated to produce light recycle solvent 80°-200° C. and heavy bottoms recycle product. The cut point between middle distillate and bottoms (nominally 450° C.) was adjusted to give the desired amount of recycle. The series was continued until equilibrium had been established.

Reaction conditions were: Coal impregnated with 0,5% $MoO_3$ as ammonium molybdate; temperature 440° C., pressure 205 bar, reaction time at 440° C. 75 mins.

Thus it can be seen that, under a given set of reaction conditions, it is possible to adjust the endpoint of the middle distillate fraction and also the amount of bottoms fraction, if any, by changing the recycle ratio. Of course, further control over these parameters can be exercised by changes in reaction conditions.

EXAMPLE 8

ELECTRODE COKE BY DELAYED COKING OF BOTTOMS FRACTION The heavy bottoms fraction as produced in example 7 was subjected to coking in the laboratory. For comparison purposes, conventional SRC from the same coal was similarly coked. The two coal-derived cokes plus a sample of premium-grade petroleum coke were made into small electrodes, which were graphitized and their coefficients of thermal expansion determined:

| | CTE. $10^{-6}$/°C. at 200° C. |
|---|---|
| Coke from our invention | 0,36 |
| Coke from conventional SRC | 1,51 |
| Premium petroleum coke | 0,47 |

Thus the coke obtained from heavy residue produced in accordance with the invention, is much superior to the coke produced from conventional SRC and compares favourably with premium-grade petroleum coke. It should be stressed that petroleum feedstocks for the production of premium electrode coke are getting scarce and the production of such cokes from coal feedstocks will be welcomed.

The examples demonstrates that the following advantages are attainable:

(a) Substantially all the liquefiable carbonaceous components in the coal can be converted to distillates.

(b) The major product of liquefaction is a 200°–450° C. distillate fraction which can be converted by known hydrofining/hydrocracking technology to refined transport fuels. Especially important is the fact that automotive diesel oil can be a major product from the liquefaction process. With the growing emphasis on the conservation and optimal utilization of fossil fuels, the greater thermal efficiency of a diesel engine makes a process that produces diesel fuel from coal extremely attractive.

What is claimed is:

1. Process for converting coal directly into predominantly gaseous to liquid products suitable for making hydrocarbon fuel by digesting the coal in a particulate condition at elevated pressure and temperature under hydrogenation conditions, slurried in a solvent or pasting oil for coal and wherein the solvent or pasting oil includes recycled heavy bottoms fraction and a recycled lower boiling fraction, which comprises employing as the solvent or pasting oil, in which the coal is slurried, a solvent system comprising at least 20% by mass of a comparatively low boiling fraction, liquid at room temperature and boiling not higher than 200° C., more than 10% by mass of a high boiling fraction, mostly soidifiable at room temperature, but liquid at the digesting temperature and not more than 30% by mass boiling between 200° and 450° C., maintaining said temperature for digesting above the critical temperature of the components of the low boiling fraction and distillatively fractionating the resulting mixture of solvent system and digestion products, recovering from said fractionating liquid hydrocarbons, those boiling from 200°-450° C. constituting not less than 50% of the total liquid hydrocarbons recovered and recycling from said fractionating to the slurrying stage material comprising a fraction boiling below 200° C. and a bottom fraction.

2. Process according to claim 1, wherein the fractionating is conducted so that more than 50% by mass of all products withdrawn and recovered from the fractionating is in the boiling point range from 200° to 450° C.

3. Process according to claim 1 wherein the solvent or pasting oil in which the coal is slurried contains from 0 to 20% by mass material boiling between 200° and 450° C.

4. Process according to claim 1 wherein the coal is slurried with said pasting oil in a ratio of pasting oil to coal of from 5:1 to 1:1,5 (by mass).

5. Process according to claim 1 wherein at the slurrying stage the ratio of coal to high boiling fraction is from 1:0,5 to 1:3, the high boiling fraction being substantially composed of bottoms fraction of which upwards of 80% boils above 400° C. at normal pressure.

6. Process according to claim 1 wherein the pasting oil contains from 20 to 80% by mass of low boiling solvent, boiling in the range 35° to 200° C.

7. Process according to claim 1 wherein the high boiling fraction contained in the pasting oil is substantially composed of bottoms fraction of which upwards of 80% boils above 400° C. at normal pressure and which has a ring-and-ball softening temperature above 80° C.

8. Process according to claim 1 wherein from 80 to 100%, by mass of the pasting oil is obtained by recycling from the fractionating step.

9. Process according to claim 1 wherein said digesting proceeds at a temperature of from 400° C. and 480° C., at a hydrogen partial pressure of from 50 to 250 bar and in the presence of a hydrogenating catalyst.

10. Process as claimed in claim 1 carried out in the presence of a catalyst of one or more of the metals molybdenum, tungsten, iron and cobalt, all in the sulphide state.

11. Process as claimed in claim 1 wherein the digested coal slurry is subjected to a step of separating off undissolved solids under supercritical conditions, in which the solubilised coal components are distilled off, carried over with the supercritical solvent vapours, whilst the insolubles are left behind as a residue.

12. Process according to claim 1 wherein soluble bottoms fraction of the fractionating step is recovered as a product.

13. Process according to claim 3 wherein the solvent or pasting oil in which the coal is slurried contains from 0 to 10% by mass material boiling between 200° and 450° C.

14. Process according to claim 13 wherein said material represents less than 5% by weight.

15. Process according to claim 14, wherein the ratio is from 5:1 to 2:1.

16. Process according to claim 15, wherein the ratio is from 3:1 to 2:1.

17. Process as claimed in claim 5, wherein said ratio is from 1:0,8 to 1:2,5.

18. Process as claimed in claim 17, wherein said ratio is from 1:1 to 1:2.

19. Process according to claim 6 wherein the pasting oil contains high boiling fraction, being substantially composed of bottoms fraction of which upwards of 80% boils above 400° C. at normal pressure, and low boiling fraction in a mass ratio of from 3:1 to 1:3.

20. Process according to claim 19 wherein said ratio is from 2:1 to 1:2.

21. Process according to claim 19 wherein the pasting oil contains more than 30% by mass of said high boiling fraction.

22. Process according to claim 21 wherein the coal is brown coal and wherein the pasting oil contains more than 35% by mass of said high boiling fraction.

23. Process according to claim 9, wherein said digesting proceeds at from 400° to 470° C., from 50 to 200 bar hydrogen partial pressure, from 80 to 300 bar total reactor pressure, from 10 to 100 minutes residence time and a catalyst content equivalent in catalytic effect to from 0,1 to 10% by dry mass ammonium molybdate impregnation of the coal.

24. Process according to claim 23, wherein the coal is slurried with pasting oil in a mass ratio of from 1:2 to 1:5 and the pasting oil comprises from 40 to 60% by mass of low boiling fraction boiling in the range 35° to 200° C. and from 60 to 40% by mass of high-boiling fraction, substantially composed of bottoms fraction of which upwards of 80% boils above 400° C. at normal pressure.

25. Process according to claim 12, wherein said recovered bottoms fraction is subjected to delayed coking to produce needle coke.

26. The process for converting coal directly into predominently gaseous to liquid products suitable for making hydrocarbon fuel by digesting the coal in a particulate condition at elevated pressure and temperature under hydrogenation conditions, slurried in a solvent or pasting oil for coal wherein the solvent or pasting oil includes recycled heavy bottoms fraction and a recycled lower boiling fraction, and wherein the solvent or pasting oil, in which the coal is slurried, a solvent system comprising a comparatively low boiling fraction, liquid at room temperature and boiling below 200° C., and a high boiling fraction which remains unboiled at temperatures below about 400° C., the mass ratio of the low boiling fraction to the high boiling fraction is about 3:1 to 1:3.

27. The process according to claim 26 wherein the solvent or pasting oil in which the coal is slurried contains from 0 to 20% by mass material boiling between 200° and 450° C.

28. The process according to claim 27 wherein the solvent or pasting oil in which the coal is slurried contains from 0 to 10% by mass material boiling between 200° and 450° C.

29. The process according to claim 28 wherein said material represents less than 5% by weight.

30. The process according to claim 29 and including the step of maintaining said temperature for digesting above the critical temperature of the components of the low boiling fraction and distillatively fractionating the resulting mixture of solvent system and digestion products.

31. The process according to claim 30 and including the step of recovering from said fractionating liquid hydrocarbons, those boiling from 200° to 450° C. constituting not less than 50% of the total liquid hydrocarbons recovered and recycling from said fractionating to the slurrying stage material comprising a fraction boiling below 200° C. and a bottom fraction.

* * * * *